United States Patent

[11] 3,628,394

[72] Inventors Gerald R. Keatinge
Bayville;
Herman S. W. Young, Huntington Station, both of N.Y.
[21] Appl. No. 9,755
[22] Filed Feb. 9, 1970
[45] Patented Dec. 21, 1971
[73] Assignee Sperry Rand Corporation

[54] OPERATOR-MANIPULATIVE CONTROL APPARATUS
17 Claims, 12 Drawing Figs.

[52] U.S. Cl. .................................................. 74/471 XY, 244/83 E
[51] Int. Cl. ........................................................ G05g 9/04
[50] Field of Search ............................................. 74/471 XY, 471; 244/83 E

[56] References Cited
UNITED STATES PATENTS
3,447,766  6/1969  Palfreyman ................. 74/471 X
3,493,906  2/1970  Zetterberg .................. 74/471 X Primary Examiner—Milton Kaufman
Attorney—S. C. Yeaton ABSTRACT: An operator-manipulative control mechanism comprising a spherical housing internally suspended from a fixed center post by a network of interconnected coil springs and leaf springs, the latter being cantilevered from the center post so as to flex in response to variously directed motions of the housing whereby strain gauges mounted thereon for sensing the flexure provide resolved control signals proportionate to operator forces applied to the housing.

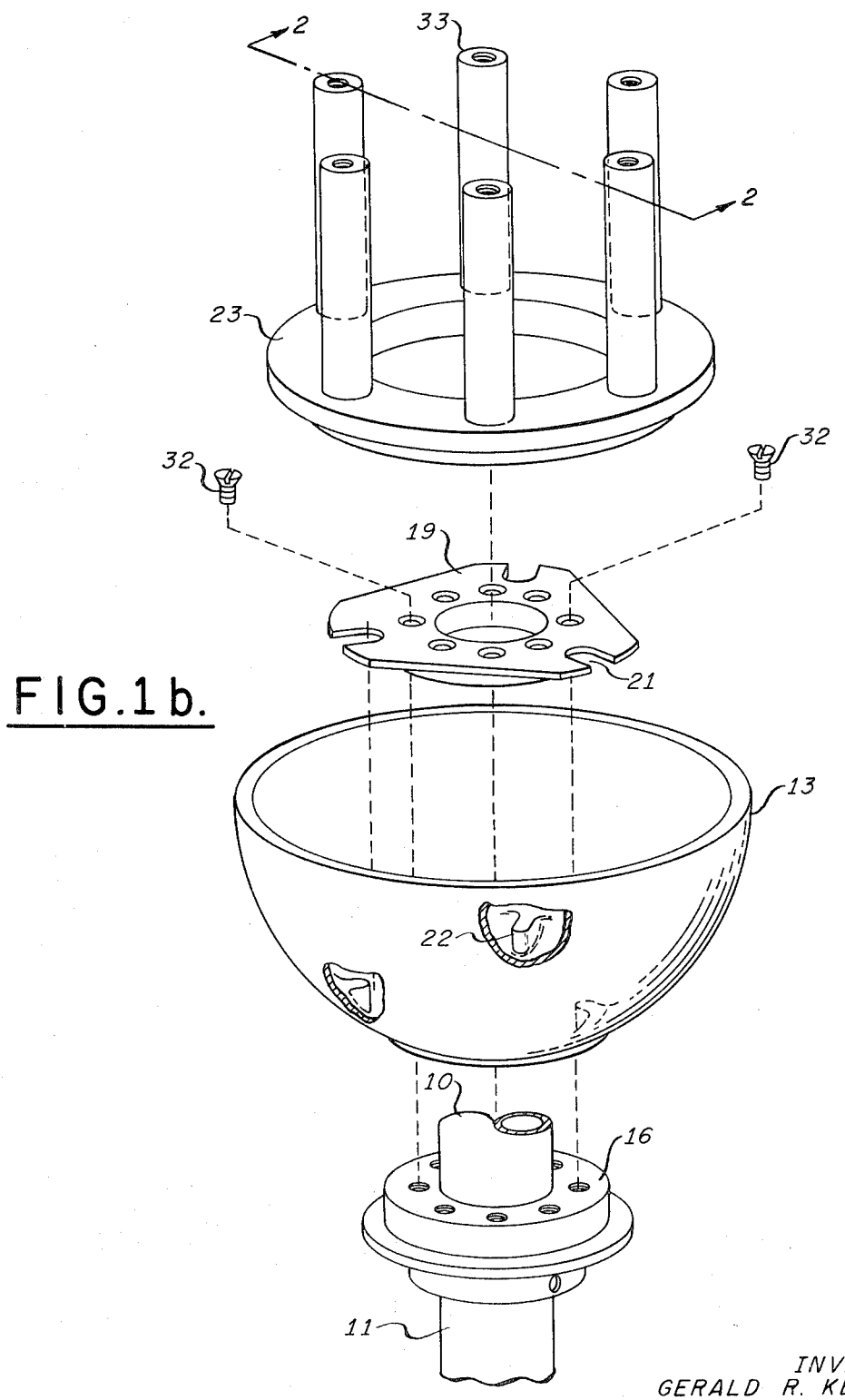

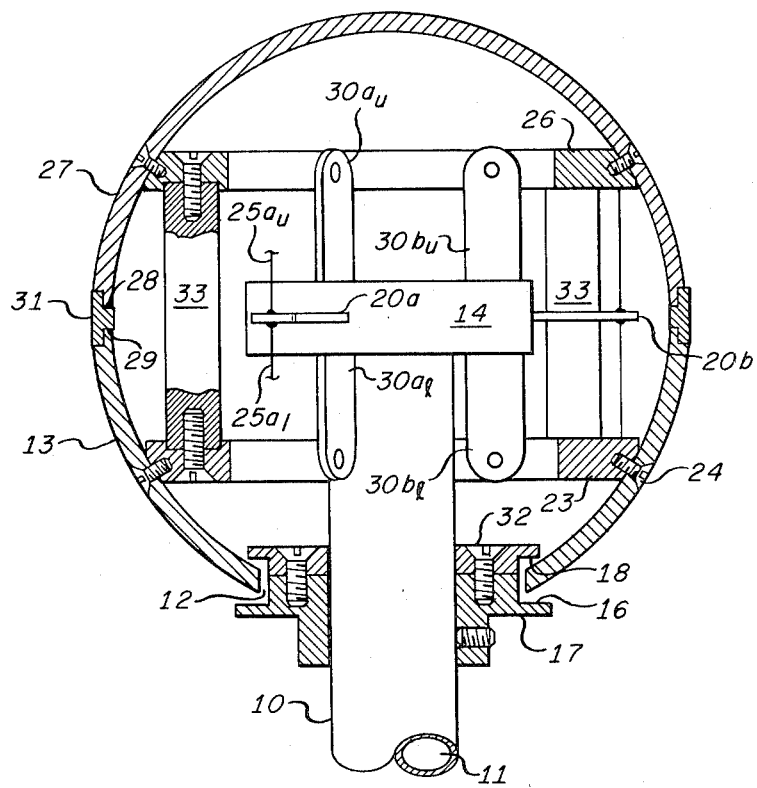
FIG.2.
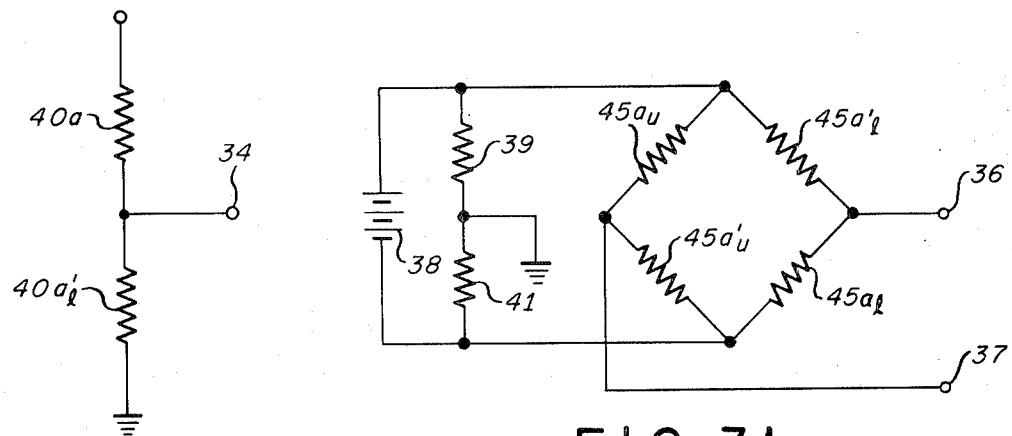
FIG.3a.
FIG.3b.
INVENTORS
GERALD R. KEATINGE
HERMAN SAI WUN YOUNG
BY
ATTORNEY

INVENTORS
GERALD R. KEATINGE
HERMAN SAI WUN YOUNG
BY

ATTORNEY

OPERATOR-MANIPULATIVE CONTROL APPARATUS

BACKGROUND OF THE INVENTION

This invention relates to an operator-manipulative apparatus for generating control signals, particularly motion-controlling signals for transmittal to a vehicle propulsion system. More specifically, it relates to a force-responsive mechanism comprising a plurality of cantilevered leaf springs having strain gauges affixed thereto for sensing flexure of the springs in accordance with operator applied forces and torques so as to provide resolved proportionate control signals.

Force responsive control mechanisms wherein the amplitude of the generated signal is proportional to the magnitude of an applied force are well known in the art. The control apparatus of the present invention, however, incorporates a unique spring assembly enabling switchless control in as many as six degrees of freedom. Moreover, the spring assembly is adaptable to being conveniently configured in accordance with the thruster or propulsion arrangement of a vehicle which is to be controlled so that the translational and rotational vectors generated by the vehicle propulsion system correspond directly to the translational forces and rotational torques applied by the controlled operator. This is achieved by the provision of strain gauges arranged on the spring assemblage in a configuration corresponding to that of the vehicle thrust elements whereby any force applied to the movable portion of the controller is resolved into propulsion system coordinates, the resultant vector sum of the strain gauge output signals having an amplitude and polarity corresponding to the magnitude and direction of the applied control force. Thus, since the control signals are inherently resolved in the controller, the necessity for auxiliary electronic resolving equipment is eliminated.

Although the controller is described herein with reference to a vehicle propelled by six thrusters, three horizontally disposed and three vertically disposed in triangular patterns, it should be understood that the principles involved are also applicable to other propulsion system arrangements and indeed to other control applications involving resolution of operator forces.

SUMMARY OF THE INVENTION

A preferred embodiment of the invention incorporates a substantially spherical shell having a hole at the bottom for receiving one end of a center post which is adapted for attachment at the other end to a fixed base. A plurality of flat leaf springs are secured in cantilevered fashion to the end of the post enclosed in the shell. The leaf springs are coupled by coil springs to upper and lower support rings which are internally connected to the shell, respectively above and below the spring assembly so that the shell is suspended by the network of springs in movable relationship to the center post. Each coil spring is characterized by high longitudinal constraint and low lateral constraint whereupon it resists motion in a direction parallel to its longitudinal dimension and thereby causes the leaf springs to which it is coupled to flex in response to such motion.

More specifically, three horizontally disposed leaf springs equiangularly distributed about the center post are connected to the upper and lower support rings by vertically directed coil springs so as to flex in response to up/down motion (heave) of the sphere and rotation thereof about orthogonal horizontal axes (pitch and roll) or any combination of such motions. Three sets of vertically disposed springs are also equiangularly distributed about the center post, each set consisting of one spring cantilevered vertically upward and another spring cantilevered vertically downward. The upwardly extending leaf springs are each coupled by horizontally directed coil springs to the upper support ring and the downwardly extending leaf springs are similarly connected to the lower support ring thereby enabling the vertically disposed leaf springs to flex in response to both rotation (yaw) of the shell about the longitudinal (vertical) axis of the center post and translation of the shell along orthogonal horizontal axes (surge and sway) or any combination of such rotation and translation. Strain gauges mounted on the leaf springs and connected in appropriate voltage divider or bridge circuit configurations provide electrical signals representative of the displacement and rotation of the shell in the six degrees of freedom. In particular, the gauges affixed to the vertically disposed leaf springs for sensing yaw, surge and sway are arranged in a manner to cancel any pitch and roll commands that are coupled thereto. As a consequence, the electrical signals provided by the strain gauges are directly representative of the operator applied forces and torques.

As a further refinement, a mechanical stop arrangement is provided in the vicinity of the hole at the bottom of the shell to limit mechanical motion of the shell and thereby prevent damage to the spring and strain gauge components.

BRIEF DESCRIPTION OF THE DRAWINGS

FIGS. 1a and 1b are exploded views in perspective of the upper and lower portions, respectively, of a preferred embodiment of a control mechanism constructed in accordance with the principles of the present invention;

FIG. 2 is a sectional view taken along lines 2—2 of FIGS. 1a and 1b which more clearly indicates the physical arrangement of various components of the control mechanism;

FIGS. 3a and 3b are schematic illustrations of the strain gauge circuits used in the apparatus of FIGS. 1a and 1b;

DESCRIPTION OF THE PREFERRED EMBODIMENT

Figure 1A:
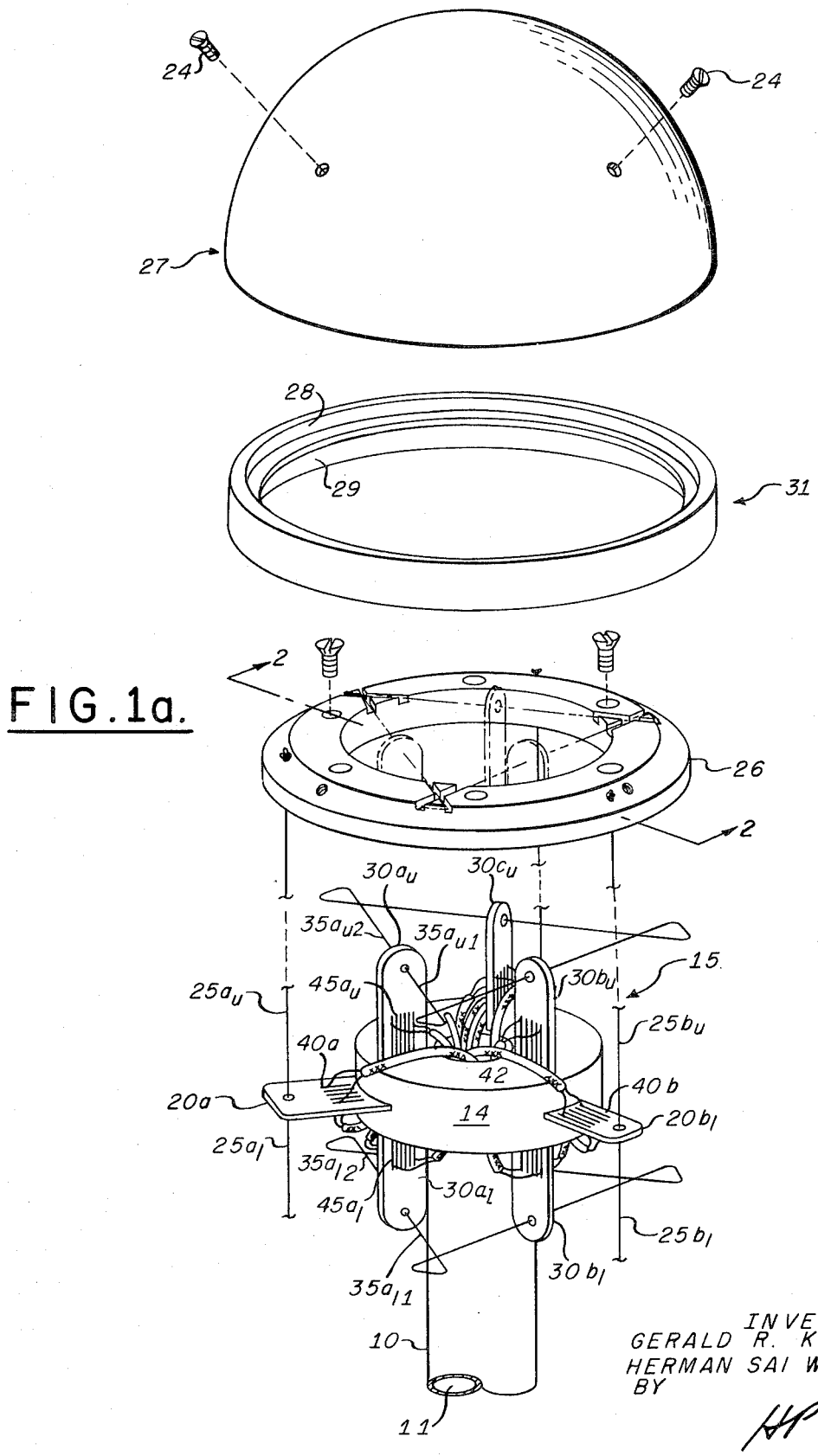

Referring to FIGS. 1a, 1b and 2, the controller of the present invention comprises a support post 10 adapted to be secured at the lower end 11 to a fixed base while the upper portion of the post extends through a hole 12 in lower hemispherical shell 13. A spring assembly 15 is connected to a flange 14 on the upper end of the post. When assembled, the lower shell 13 rests above the upper surface 16 of a first mechanical stop member 17 and below the lower surface 18 of a second mechanical stop member 19 in noncontacting relation with both stop members, the second (upper) member having slots 21 arranged in mating relation with protrusions 22 on lower shell 13 for limiting yawing motion of the controller as will be described subsequently. The first (lower) stop is bolted to support post 10 in conventional fashion and then after the lower shell 13 is in place the second (upper) stop is secured to the lower stop as by screws 32.

A lower support ring 23 is inserted in the lower shell and connected thereto by screws 24 such that the ring is located about midway from the bottom of the shell in substantially concentric relation with support post 10. An upper support ring 26 is similarly connected in upper hemispherical shell 27 and the upper and lower shells fitted into respective upper and lower grooves 28, 29 in equatorial band 31 to form a spherical housing wherein the spring assembly 15 is centrally located. An array of columns 33, concentrically disposed about support post 10, are connected between the upper and lower support rings to lend additional rigidity to the spring support ring combination.

Suspension of the spherical housing and the rings 23, 26 connected thereto is achieved by the provision of the spring assembly which will now be described in greater detail. The horizontally disposed cantilevered beams 20a, 20b, typically flat leaf springs, are connected by vertically directed coil springs $25a_l$, $25a_u$ and $25b_l$, $25b_u$ to the upper and lower rings affixed to the spherical housing. Actually, three horizontal leaf springs are provided equiangularly distributed about the center post as previously explained. Likewise, vertically disposed leaf springs $30a_l$, $30a_u$ $30b_l$, $30b_u$, $30c_l$ (not shown) and $30c_u$, having their major surfaces directed radially from the center of support post 10, are cantilevered from flange 14 and connected from their free ends by horizontally directed coil springs, herein designated with reference to leaf springs $30a_l$ and $30a_u$ as $35a_{l1}$, $35a_{l2}$, $35a_{u1}$, and $35a_{u2}$. Similar coil springs, not designated by reference numerals, are shown on the drawing in connection with the other vertically disposed leaf springs. The coil springs can be connected to the leaf springs and support rings by any conventional means such as soldering or simply by tying thereto as shown at the coil spring leaf spring and coil spring support ring junctions, respectively. In an unflexed or unstrained state of all the springs the spherical housing is thus suspended in movable relation to the support post. It will therefore be appreciated that the sphere can be translated in any direction in a horizontal plane normal to the support post and also rotated about a vertical axis collinear with the post. Further, it can be translated in the direction of the vertical axis and rotated about orthogonal axes lying in the horizontal plane.

In operation of the device, motion of the sphere as described above will produce command signals for transmittal to the propulsion system of a remotely controlled vehicle. The command signals are obtained from strain gauges 40a and 40b mounted on the horizontal leaf springs, as by cementing thereto, and gauges $45a_l$ and $45a_u$ mounted on leaf springs $30a_l$ and $30a_u$, respectively. Additional strain gauges are similarly mounted on the other leaf springs. In actuality, strain gauges are provided on both sides of each of the cantilevered leaf springs to produce the command signals as will be described hereinafter with reference to FIGS. 3a and 3b. Each strain gauge provides a signal having an amplitude essentially proportional to the extent of flexing of the spring on which it is mounted. In this regard it should be noted that the coil springs connecting the cantilevered leaf springs to the upper and lower support rings 23, 26 are preferably selected to provide a high degree of constraint along their lineal axis and comparatively low constraint transverse to said axis. The coil springs are thus able to resist expansion or contraction along their lineal dimension and therefore cause flexure of the related leaf springs in response to forces so directed. In the direction orthogonal to the lineal dimension, however, the coil springs readily flex in response to forces applied to the sphere and therefore do not couple such operator applied forces to the leaf springs. Thus, by this manner of construction in conjunction with the strain gauge arrangement as described in the following paragraph, the applied forces are not erroneously coupled into other command channels.

The operation of the strain gauges in producing the command signals will now be explained with reference to FIGS. 3a and 3b in conjunction with FIGS. 1a and 1b. As previously stated, each leaf spring has a strain gauge element on both sides. Therefore, considering the horizontally arranged leaf springs, for example, spring 20a, in addition to the strain gauge 40a affixed to the top surface thereof, another strain gauge 40a' (not shown in FIG. 1a) is mounted on the bottom surface. Strain gauges 40a and 40a' are typically connected in a voltage divider circuit excited from a source of potential E as shown in FIG. 3a, or alternatively can be connected in a bridge circuit with another pair of series connected fixed resistors if desired, the output control signal being obtained at terminal 34. Operator applied force causing the shell to move downward is resisted by the longitudinal constraint of springs $25a_l$, $25a_u$, and $25b_l$, $25b_u$ with the result that the free ends of the horizontally disposed leaf springs are deflected downward with respect to their point of connection to flange 14. Hence, strain gauge 40a is placed under tension while gauge 40a' on the under surface of spring 20a is simultaneously placed under compression thereby causing the resistance of gauge 40a to increase and that of gauge 40a' to decrease whereupon the voltage at output terminal 34 is decreased from its quiescent value at the unstrained state of the horizontal leaf springs. Likewise, motion of the shell in the upward direction will cause the output voltage to increase from its quiescent value. The quiescent output voltage obviously can be balanced out in a subsequent amplifier stage if necessary.

In the case of the vertically disposed leaf springs, the set comprising gauges $45a_l$ and $45a_u$ will be considered as a representative example. Here again in addition to the strain gauges mounted on the front surface of the springs other gauges $45a'_l$ and $45a'_u$ (not shown in FIG. 1a) are mounted respectively on the rear surfaces of the lower and upper springs $30a_l$ and $30a_u$. These strain gauges are preferably connected in a bridge circuit in parallel with series resistors 39, 41 grounded at their junction point, as shown in FIG. 3b. Gauges $45a_u$ and $45a'_u$ form the upper and lower portions respectively of one branch of the bridge circuit while gauges $45a'_l$ and $45a_l$ likewise form the respective upper and lower portions of the other branch. A battery 38 supplies excitation to the circuit, the output signal in this instance being obtained across terminals 36 and 37. Force applied to the spherical housing in a direction toward the front surfaces of the spring set $30a_l$ and $30a_u$ will be resisted by coil springs $35a_{l1}$, $35a_{l2}$ and $35a_{u1}$, $35a_{u2}$ with the result that the free ends of the springs will tend to flex backward into the figure thereby placing gauges $45a_l$ and $45a_u$ in tension while simultaneously gauges $45a'_l$ and $45a'_u$ are under compression. From the circuit connection of FIG. 3b it is therefore seen, since tension increases resistance and compression decreases it, that the voltage at terminal 36 increases while that at terminal 37 decreases. Flexing of springs $30a_l$ and $30a_u$ in the opposite direction causes an opposite change in the voltage at terminals 36 and 37 thereby reversing the polarity of the output signals and, as should now be apparent from the foregoing description, the amplitude of the voltage change will be proportionate to the extent of flexing of the leaf springs. The same is true, of course, for the horizontally disposed springs.

At this point it should be noted, as shown in FIG. 1a, that the leads 42 for applying excitation to the strain gauges and deriving the output signals therefrom are passed through the center of the support post for connection to external circuits and further that the ends of the leads proximate the gauges are preferably coiled to allow play for the spring flexure.

Figure 4:
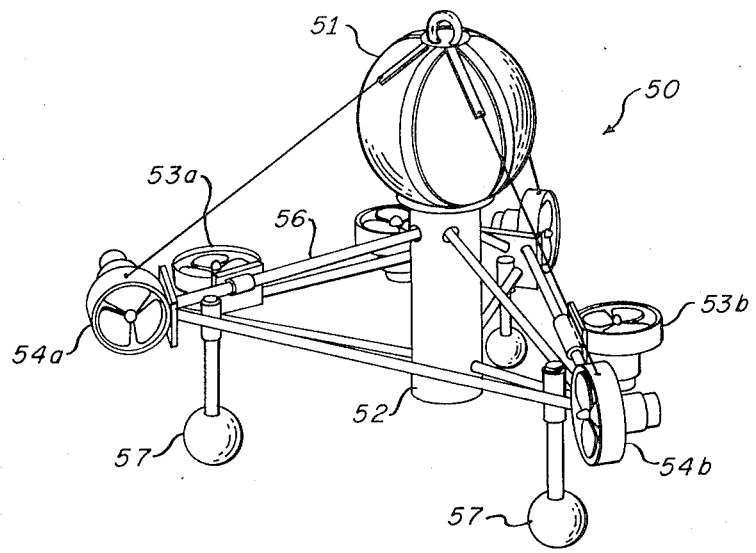
FIG. 4 is a perspective drawing of a submersible vehicle which is conveniently controlled by the apparatus of FIGS. 1a and 1b.

Operation of the controller for guiding a craft will be described with reference to a self-propelled submersible vehicle 50 (FIG. 4), of the type disclosed in U.S. patent application Ser. No. 9,759 filed concurrently herewith in the same of Gerald R. Keatinge and assigned to the assignee of the present invention, comprising a floatation ball 51 mounted on a centralized cylindrical section 52 from which a triangular configuration of hydraulically driven vertically directed propellors 53a, 53b, 53c and horizontally directed propellors 54a, 54b, 54c are supported by truss members 56 and 56c' arranged in sets equiangularly distributed about the cylindrical section. Various electrical and hydraulic components necessary for the operation of the vehicle are incorporated in the cylindrical section. The vehicle is constructed so that its center of gravity is below the center of buoyancy in order to maintain vertical stability. Legs 57 function to support the vehicle in a rest position on the under water surface.

Figure 5A:
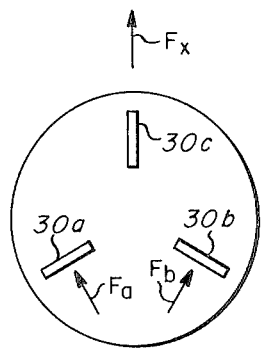
FIGS. 5a to 5f are simplified force diagrams which are useful for explaining the operation of the control mechanism.
Figure 5A:
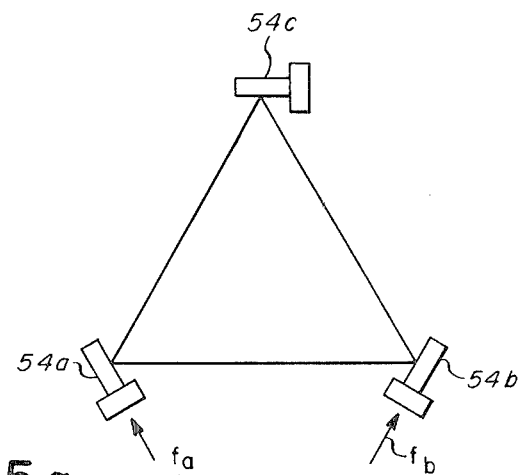
Figure 5B:
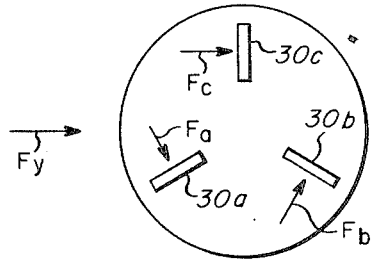
Figure 5B:
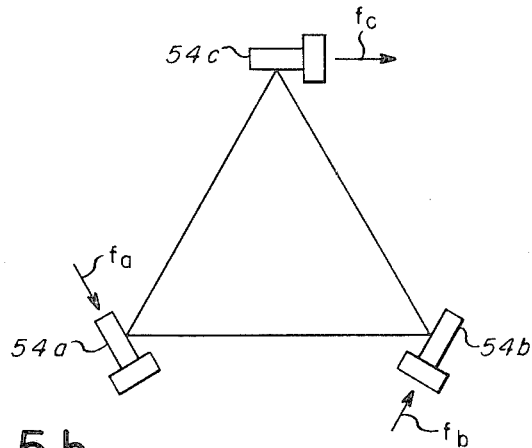
Figure 5C:
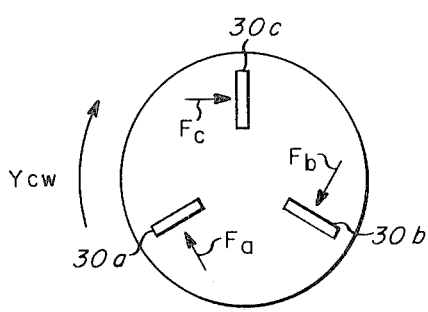
Figure 5C:
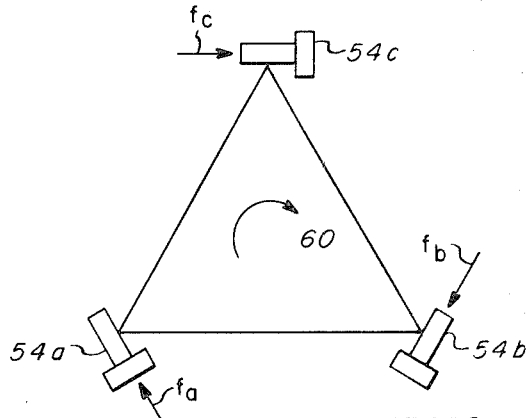

First, consider the control for forward-aft (surge), starboard-port (sway), and yaw motion of the vehicle. These controls will be described with reference to FIGS. 5a, 5b and 5c which for convenience of illustration depict only the upwardly extending leaf springs. It will be understood, however, that the comments pertaining thereto apply as well to the downwardly extending springs. Referring to FIG. 5a, assume that an operator force is applied in a manner which tends to translate the spherical housing in the fore-aft direction, such force being represented by the vector $F_x$ oriented parallel to the plane of leaf spring 30c. This force is resolved into vector forces $F_a$ and $F_b$ directed normal to the planes of leaf springs 30a and 30b respectively, thereby producing signals of appropriate magnitude and polarity at the output terminals of the bridge circuits described hereinbefore. These output signals are utilized to produce proportionate forces $f_a$ and $f_b$, respectively, from the horizontally directed propellors 54a and 54b in a manner to translate the vehicle in the same direction as the controller housing is translated by the operator. As previously explained with regard to the operation of the strain gauge circuits, an oppositely directed force applied by the operator will reverse the direction of the strain gauge output signals and cause the horizontal propellors to produce a thrust in the opposite direction from that described above. As shown in FIG. 5b, a force $F_y$, orthogonal to the force $F_x$, affects all three strain gauge outputs, the force $F_y$ being resolved into components $F_a$, $F_b$, and $F_c$ at leaf springs 30a, 30b and 30c, respectively, where $F_c$ is larger than $F_a$ and $F_b$ by one-half as determined by the angular orientation of the springs with respect to the applied force, and corresponding vehicle forces $f_a$, $f_b$, $f_c$ at thrusters 54a, 54b, 54c. In the case of yawing motion where the operator applies a torque to twist the housing about the support post, a clockwise torque Ycw as shown in FIG. 5c is resolved into forces $F_a$, $F_b$, and $F_c$ at the corresponding springs 30a, 30b and 30c resulting in similarly directed thrust forces $f_a, f_b, f_c$ at thrusters 54a, 54b, 54c which cause the vehicle to rotate about a vertical axis 60 extending through the center of the vehicle floatation ball 51 and cylindrical section 52.

Figure 5D:
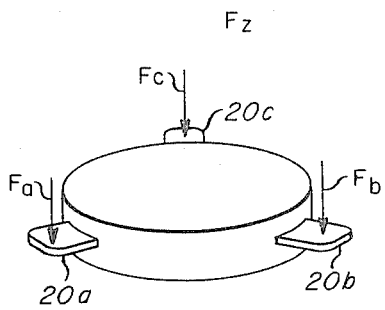
Figure 5D:
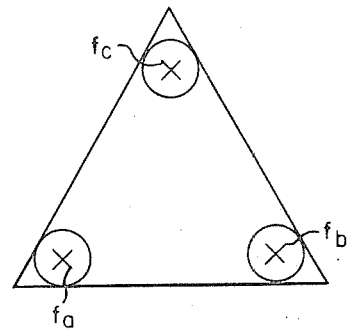
Figure 5E:
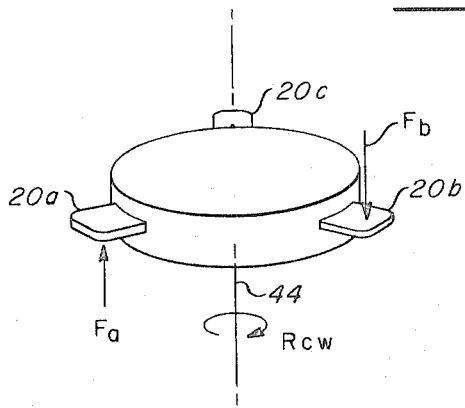
Figure 5E:
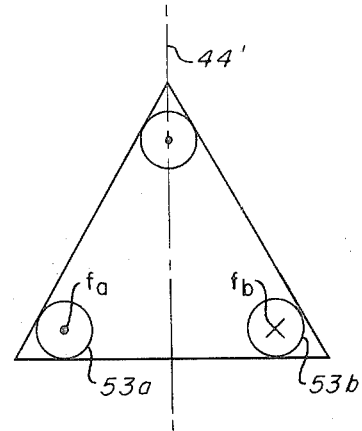
Figure 5F:
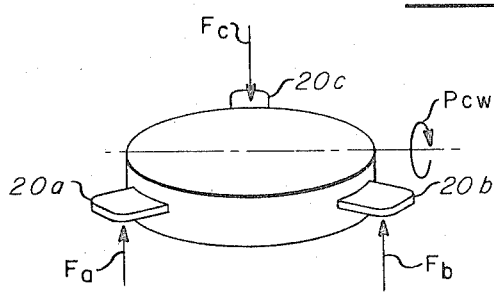
Figure 5F:
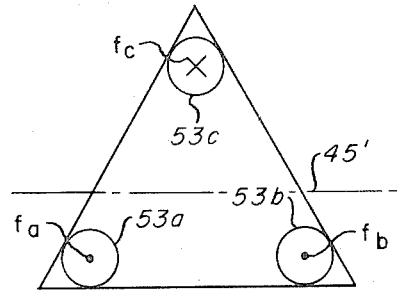

The control for up-down (heave), pitch and roll motion is accomplished in a similar manner by means of electric signals coupled between the horizontally disposed of leaf springs of the controller and the vertically oriented propellors on the vehicle. It will be noted that the signal gain for these controls is half that provided for the three previously described controls since only two strain gauges are involved as compared to four in the bridge circuit arrangements of the vertically disposed leaf springs. In any event, additional gain can be realized if required simply by incorporating appropriate amplifying devices in the signal path between the controller and the vehicle propellors. In the case of a heave command for moving the vehicle downward an operator force $F_z$ (FIG. 5d) applied to the controller housing is sensed by the gauges on springs 20a, 20b and 20c as forces $F_a$, $F_b$, $F_c$ to produce equivalent downward directed forces $f_a, f_b, f_c$ at the vertically oriented propellors 53a, 53b and 53c. For a clockwise roll command Rcw, as shown in FIG. 5e, about a horizontal axis 44 parallel to the plane of leaf spring 30c the applied force is sensed by gauges on the springs 20a and 20b as upward and downward directed forces $F_a$ and $F_b$ respectively, which result in equivalent thrust vectors $f_a, f_b$ at thrusters 53a, 53b causing the vehicle to roll about horizontal axis 44'. In a similar fashion a pitch force Pcw about horizontal axis 45', as indicated in FIG. 5f, will be sensed as a downward force $F_c$ at leaf spring 20c and as upward forces $F_a$ and $F_b$ at leaf springs 20a and 20b producing correspondingly directed thrust vectors $f_a, f_b, f_c$, at vertically oriented vehicle propellors 53a, 53b, 53c causing the vehicle to pitch about the horizontal axis 45 orthogonal to the axis 44 of FIG. 5e.

From the foregoing description of the operation of the controller in directing a vehicle it is seen that by the provision of a thruster configuration corresponding to the signal producing arrangement at the controller, the vehicle motion is made to conform to the operator motion of the controller housing for all degrees of freedom. In other words, by arranging the operator-force sensing elements in a mechanical configuration corresponding to the mechanical orientation of the various vehicle thrust producing devices, the forces applied to the controller by the operator are automatically resolved into electrical signals each of which is proportional to the thrust vector required from the corresponding vehicle thruster. In this manner, the operator applied forces command the generation of a set of vehicle thrust vectors whose vector sum corresponds to the operator applied force vector. It should be apparent that the same mode of operation will obtain with any controller and thruster configuration as long as conformity therebetween is maintained.

As a further point of interest the affect of the pitch and roll commands upon the vertically oriented springs must be considered. As explained above, these springs are normally associated with yaw and horizontal translation control; but from a study of the drawings, it will be apparent that these springs will also flex in response to pitch and roll commands. Compensation for this undesirable cross-coupling is achieved by the unique arrangement of the strain gauges and will be explained for illustrative purposes with reference to a pitch command applied as described in connection with FIG. 5f. In response to such a command gauges $45a_u$ and $45a'_l$ (FIG. 1a) are placed under tension while gauges $45a'_u$ and $45a_l$ are compressed. As a consequence, the voltages at output terminals 36 and 37 (FIG. 3b) remain unchanged. The same conditions prevail for the gauges mounted on leaf springs $30b_l$, $30b_u$ and $30c_l$, $30c_u$ so undesired coupling is avoided for both pitch and roll commands.

Finally, it can be seen by referring to FIG. 2 that motion of the control housing is limited for roll, pitch, surge, sway and heave commands by physical contact of the shell 13 with either the support post 10 or the mechanical stop members 17, 19. Yaw motion, on the other hand, is limited as shown in FIG. 1b by physical contact of the protrusions 22 with the sides of slots 21.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. An operator-manipulative control apparatus comprising
   a vertical support post adapted to be secured at one end to a fixed base,
   a plurality of springs affixed in cantilevered fashion to the other end of said support post,
   an operator-manipulative member,
   means coupling said cantilevered springs to the manipulative member such that said manipulative member is suspended in movable relation to said support post, said coupling means including resilient members characterized by a high degree of constraint along the line of connection between said cantilevered springs and said manipulative member and comparatively low constraint orthogonal to said line of connection whereupon motion of the manipulative member causes flexing of one or more of said springs, and
   a plurality of flexure-sensing elements, at least one such element being affixed to each cantilevered spring to provide a signal representative of the extent and direction of flexing of said cantilevered spring.

2. The apparatus of claim 1 wherein the resilient members are coil springs.

3. The apparatus of claim 1 wherein
   the cantilevered springs are substantially planar leaf springs and at least two of said springs are arranged with their plane surfaces directed radially relative to the longitudinal axis of said support post and mounted on a flange of said support post, one of said two springs extending vertically upward from said flange and the other of said two springs extending vertically downward from said flange in collinear relation with said one spring, and
   a flexure-sensing element is affixed to each side of said two leaf springs, said elements being connected in a bridge circuit such that the flexure sensing elements on the front and rear surfaces of said upwardly extending spring form one branch of said bridge and the flexure sensing elements on the front and rear surfaces of said downwardly extending spring form the other branch of said bridge.

4. The apparatus of claim 3 wherein the resilient members are coil springs a coil spring being connected between said manipulative member and a plane surface of each cantilevered spring with the lineal axis of said coil spring oriented normal to said plane surface.

5. The apparatus of claim 1 wherein at least two of the plurality of cantilevered springs are vertically oriented and angularly disposed relative to one another so as to be capable of flexing in response to both omnidirectional translation of said manipulative member along a horizontal plane and rotation of said manipulative member about the longitudinal axis of said support post.

6. The apparatus of claim 5 wherein the vertically oriented cantilever springs total three in number and are equiangularly distributed about the longitudinal axis of said support post.

7. The apparatus of claim 6 wherein the cantilevered springs are substantially flat leaf springs oriented such that the plane surfaces thereof are radially directed from the longitudinal axis of said support post and the resilient members are horizontally disposed coil springs connected between said manipulative member and the planar surfaces of said leaf springs in normal relation thereto.

8. The apparatus of claim 1 wherein at least two of the plurality of cantilevered springs are horizontally oriented and angularly disposed relative to one another so as to be capable of flexing in response to both rotation of said manipulative member about orthogonal horizontally oriented axes and translation of said manipulative member in a direction parallel to the longitudinal axis of said support post.

9. The apparatus of claim 8 wherein the horizontally oriented springs total three in number and are equiangularly distributed about the longitudinal axis of said support post.

10. The apparatus of claim 9 wherein the cantilevered springs are substantially flat leaf springs and the resilient members are vertically disposed coil springs connected between said manipulative member and the planar surfaces of said leaf springs in normal relation thereto.

11. The apparatus of claim 8 wherein at least 2 of the plurality of cantilevered springs are vertically oriented and angularly disposed relative to one another so as to be capable of flexing in response to both omnidirectional translation of said manipulative member along a horizontal plane and rotation of said manipulative member about the longitudinal axis of said support post.

12. The apparatus of claim 9 wherein the plurality of cantilevered springs includes six vertically oriented springs mounted on a flange of said support post, three of said springs extending vertically upward from said flange and the other three of said springs extending vertically downward from said flange in collinear relationship with respective ones of said upward extending springs, and a flexure-sensing element is affixed to each side of said horizontally and vertically oriented cantilever springs, the flexure-sensing elements of each pair of upward and downward extending springs being connected in respective bridge circuits with the elements on the front and rear surfaces of each upward extending spring forming one branch of a respective bridge and the elements on the front and rear surfaces of each downward extending spring forming the other branch of said respective bridge.

13. The apparatus of claim 12 wherein the plane surfaces of the vertically oriented springs are directed radially from the longitudinal axis of said support post and the elements on the front of the upward extending springs and the rear of the downward extending springs form the upper parts of the respective bridge circuit branches while the elements on the rear of the upward extending springs and front of the downward extending springs from the lower portions of the respective bridge circuit branches thereby rendering said bridge circuits insensitive to rotation of the operator manipulative member about said orthogonal horizontally oriented axes.

14. The apparatus of claim 13 wherein the cantilevered springs are substantially flat leaf springs and the resilient members are horizontally and vertically disposed coil springs, a horizontally disposed coil spring being connected from said manipulative member to a vertically disposed cantilever spring in normal relation to the flat surface thereof such that each cantilever spring has at least one coil spring connected from each side thereof to said manipulative member and vertically disposed coil springs being similarly connected between said manipulative member and each side of said horizontally oriented cantilever springs.

15. The apparatus of claim 14 wherein the manipulative member includes upper and lower rings concentric with the support post and respectively disposed proximate the upper and lower regions of the assembly of coil springs and cantilevered springs, said coupling means including said rings.

16. The apparatus of claim 15 wherein the manipulative member further includes a substantially spherical hollow member formed of mating hemispherical sections joined in an equatorial band, the lower of said hemispherical sections having a hole at the bottom for receiving one end of the support post so as to enclose and be disposed thereabout and the upper hemispherical section being connected to the upper ring and the lower hemispherical section connected to the lower ring.

17. The apparatus of claim 16 further including mechanical stop means formed by first and second members concentrically mounted about said support post such that said first member is internal to said spherical member and said second member is external to said spherical member in the vicinity of the hole therein, said first and second members having a radius slightly larger than the hole radius and said first member having slots disposed in mating relation with internal protrusions on said lower spherical member for limiting yawing motion of said manipulative member.

* * * * *